United States Patent Office 3,817,861
Patented June 18, 1974

3,817,861
METHOD OF COAGULATING SUSPENDED SOLID IMPURITIES IN WATER WITH SILICONE-SILICA COMPOSITIONS
George M. J. Slusarczuk, 1555 Regent St., and John F. Brown, Jr., 1479 Dean St., both of Schenectady, N.Y. 12309
No Drawing. Original application May 28, 1971, Ser. No. 148,182. Divided and this application May 21, 1973, Ser. No. 362,446
Int. Cl. C02b 1/20
U.S. Cl. 210—47
12 Claims

ABSTRACT OF THE DISCLOSURE

Water-dispersed compositions resulting from contacting silicic acid sol and a hydrolyzed carbon-functional silane have been prepared. Some of these products have been shown to be very effective flocculants, particularly for the removal of biocolloids from waste-water. Water dispersions of clay have been successfully employed in place of the silicic acid sol in the flocculation of biocolloids.

---

This is a division of application Ser. No. 148,182, filed May 28, 1971.

BACKGROUND OF THE INVENTION

Flocculants are materials used to bring about the aggregation and precipitation of suspended colloidal particles and also to cause such loosely aggregated particles of a low density precipitate (or sludge) to bind more tightly, so that it becomes more dense and more easily filtered. Flocculants are widely used in water and wastewater treatment: e.g., in the removal of silt from river water to make it acceptable for municipal use; in the removal of colloidal metal oxides from rolling mill wastewaters so as to make them suitable for discharge; in the treatment of "white water" effluents from paper mills; as aids to the removal of suspended biological wastes from sewage; and as "conditioners" for decreasing the bulk and improving the filterability of sewage sludges.

Substances having activity as flocculants fall into four main classes: the colloidal hydroxides of polyvalent metal ions, and water-soluble polymers of the anionic, nonionic, and cationic polyelectrolyte classes. The colloidal metal hydroxides, notably ferric and aluminum hydroxides, are the oldest and best known flocculants or "coagulants." Such materials are very effective flocculants for both inorganic and organic colloids, but must be used in heavy doses—often considerably greater in weight than that of the material being removed. The anionic and non-ionic organic polymers, and also the weakly anionic inorganic polymer, silicic acid sol, work at considerably lower doses. These latter materials are quite effective in treating the inorganic colloid suspensions encountered in mining, metallurgical, and heavy chemical industrial waste, and also as "flocculant aids" for use in conjunction with metal hydroxide flocculants for improving the precipitation rates and filtration rates of flocs formed therefrom, but are of only limited utility as primary flocculants for colloidal biological wastes. The cationic polyelectrolytes, also useable at much lower doses than the metal hydroxides, range from fair to good in their activity on biological colloids, although rarely matching the hydroxide coagulants in efficiency of action. The performance of such polyelectrolyte flocculants cannot be improved beyond a certain point by increasing the dose; typically there is an optimum dose for maximum precipitation, and further addition of flocculant simply causes resuspension of the precipitate.

Flocculant action (whether in forming or in densifying a precipitate of aggregated colloidal particles) obviously requires that new or additional points of attachment be established between individual particles. There are two conflicting theories as to the mechanism by which polymeric flocculants effect the formation of such interparticle attachments. One, the charge neutralization theory, holds that the polyelectrolyte molecules adsorb on the colloid particles, neutralizing the particle charges, decreasing the zeta potentials thereof, and, as a result, eliminating the charge repulsions that ordinarily keep such particles from aggregating and precipitating. The other or "bridging" theory proposes that different segments of the same polymer molecule adsorb on different particles, thereby linking them together. It is far from obvious that these two theories are either mutually exclusive or distinguishable at the molecular level. In any event, both theories require adsorption of the flocculant molecule upon the surface of the colloid particle as a critical step in the process of forming interparticle linkages.

Presumably, a variety of forms of chemical and physical bonding might be involved in the attachment of a flocculant molecule to a colloid particle. However, the fact that biological colloids (e.g. bacteria)—all of which are normally negatively charged—are only flocculated efficiently by cationic polyelectrolytes (or by positively charged metal hydroxide particles) has been interpreted to indicate that only electrostatic forces are involved in such colloid-flocculant interactions.

The terms "soluble silica" and "silica sol" are used herein to describe an aqueous system containing colloidal silica particles (ranging in size from about 10,000 A. to about 30 A.) dispersed therein. The term "silicaceous colloid" encompasses both soluble silica and silicate particles e.g. a clay colloid, in the same particle size range. Precipitation does not occur so long as the electrical charge conditions on the particles are not changed significantly. The preparation of such a system is described in "The Colloid Chemistry of Silica and Silicates" by Ralph K. Iler (pp. 90–92); in Bulletin 52–19, "Treatment of Raw and Waste Waters With PQ Soluble Silicates" (Philadelphia Quartz Company, 1964); in U.S. Pat. 2,574,902—Bechtold et al. and in U.S. Pat. 2,577,485—Rule. All the aforementioned literature and patent sources are incorporated by reference.

The term "water-dispersed" used in describing certain compositions in connection with the practice of this invention indicates that the given composition (which is prepared in an aqueous system) is in the form of a homogeneous mixture that remains homogeneous for at least about 24 hours. Soluble silica and silica sols are, of course, water-dispersed within this definition.

SUMMARY OF THE INVENTION

Water-dispersed compositions have been prepared by contacting "soluble silica" with a hydrolyzed carbon-functional silane. With some compositions prepared in this manner, the discovery of high performance flocculating capability has been made. The macromolecular structure present in this composition may consist of silicic acid polymer molecules, the outer surfaces of which are partially covered with cationic silicone molecules attached thereto. One specific system that has been found to produce very effective flocculants, particularly for the removal of biocolloids from wastewater, is produced by the reaction between a silicic acid sol and an amino-functional aliphatic silane. The flocculative effectiveness of the silicic acid polymer molecules so modified can be explained on the basis of the probable manifestation thereby both of the mechanism of attachment characteristic of silica sol and of the mechanism of attachment characteristic of cationic polyelectrolytes.

DESCRIPTION OF THE PREFERRED EMBODIMENT

Basically the invention comprises modifying soluble silicic acid polymer molecules in an aqueous sol by contact with a hydrolyzed coupling agent with the modified polymer molecules remaining dispersed. Hydrolyzable carbon-functional silanes are typical of the materials referred to as "coupling agents." Coupling agents are simply molecules that possess two different kinds of reactivity. Most of the coupling agents that are presently used to establish a chemical bond with inorganic surfaces are organo-functional silanes. The silicone portion of these molecules has a unique affinity for such materials as glass, glass fiber, silica, quartz, aluminum silicate pigments, aluminum, magnesium and even steel.

Conventionally, coupling agents are employed to provide a stable bond between two dissimilar surfaces at least one of which is inorganic, insoluble and has oxide or hydroxide groups available for reaction. Examples of such use are the treatment of glass fabric for use in reinforced plastics and the bonding of enzymes to inorganic materials, such as porous glass or insoluble colloidal silica as shown in U.S. Pat. 3,519,538—Messing et al., incorporated by reference.

In contrast thereto in the instant invention a silicaceous colloid (e.g. a silica sol, which is a concentrated aqueous dispersion of colloidal-size particles of amorphous silica having negative charge to keep them soluble) is reacted in an aqueous system with a hydrolyzed coupling agent and a water-dispersed composition is produced.

Also, for specific use as flocculants, compositions prepared by contacting a hydrolyzed coupling agent with silicate particles (e.g. clay particles) dispersed in water have been found to be effective, even though the composition may not be "water-dispersed" within the definition set forth hereinabove.

The unique capabilities afforded by the soluble modified silicic acid polymer molecules of this invention for considerably more effective introduction to and distribution in aqueous systems make this composition effective as a flocculant, as a sizing agent for glass, as a primer and/or as an anti-static agent. Evaluation of many of these water-dispersed silicone-silica compositions for their performance on both prepared bacterial cultures and on raw sewage has established that flocculation effects using small doses may be achieved that are comparable to those produced by heavy doses of inorganic coagulants. Quantitatively, the dosages used with compositions of this invention are comparable to the lower dosage levels representative of the use of organic polyelectrolytes. Unlike conventional organic polyelectrolytes, however, the flocculant compositions of this invention do not appear to cause resuspension of the floc when introduced at levels greater than the optimum.

Other very important aspects of the use of the compositions of this invention as flocculants are that the flocculation action occurs almost instantaneously (although it may take several minutes for the floc to settle); the floc produced is of a dense, firm and cohesive nature and the level of biocolloid removal is very high.

Silica sols useful in the practice of this invention may be prepared as described herein below or else commercially available aqueous colloidal silica sols, slightly modified, may be employed. "Ludox" HS and "Ludox" LS (E. I. du Pont de Nemours and Company) are examples of suitable commercial aqueous silica sols prepared in accordance with the teachings of the aforementioned U.S. Pats. 2,574,902 and 2,577,485.

Preparation from water glass solutions by the N-Sol-A (NSA) method (described in the aforementioned Bulletin 52–19) is as follows:

Solution A.—Sodium silicate: 174 g. of commercial water glass (40–42° Bé.) was diluted to 1 liter with distilled water.

Solution B.—Sulfuric acid. 25.5 g. of concentrated H$_2$SO$_4$ was diluted to about 1 liter, the concentration being adjusted such that 10.0 ml. of solution "A" in 100 ml. water required 10.0 ml. of solution "B" for neutralization to a methyl orange end-point.

First 15 ml. of water was added with stirring to 10.0 ml. of solution "A." Next, 8.5 ml. of solution "B" was added to the diluted solution "A" with stirring. The mixture was aged without stirring for 2.0 hours and then diluted with water to 100 ml. This alkaline silica solution (concentration: 5.0 mg. SiO$_2$/ml.) could be used either immediately or within as long as one month.

As is described in Example 2 below commercial silica sols may be used in the diluted condition.

Exemplary of coupling agents useful in the practice of this invention are the organo-functional/silicon-functional silicone compounds characterized in that the silicone portion of the molecule has an affinity for inorganic materials having available oxide or hydroxide groups, while the organic portion of the molecule is selected for the capability thereof to combine with organic materials, such as proteins.

A multitude of different silane coupling agents can be used to prepare the soluble silicone-silica compositions of this invention and these may be represented by the general formula:

$$R'_n SiR_{4-n}$$

where R′ is a saturated, or unsaturated or aromatic hydrocarbon residue functionalized by a member selected from the group consisting of amino, carbonyl, carboxy, isocyano, azo, diazo, thio, thia, dithia, isothiocyano, oxo, oxa, halo, ester, nitroso, sulfhydryl, halocarbonyl, amido, sulfonamido and multiples and combinations thereof; R is a hydrolyzable group compatible with R′ selected from the group consisting of alkoxy, phenoxy, halo, amino, dialkylamino and tertiary peroxyalkyl; and $n$ is an integer having a value of 1–3.

Preferred coupling agents for the practice of this invention are the amino-functional multi-alkoxy silanes, such as:

TABLE I

| Silane: | Code identification |
|---|---|
| 3-aminopropyltriethoxysilane | AP. |
| N - (2 - aminoethyl) - 3 - aminopropyltrimethoxysilane | EP. |
| 4,7,10-triazadecyltrimethoxysilane | DP. |
| 4,7,10,13,16 - pentaazahexadecyltrimethoxysilane | TP. |
| 1,4 - bis(dimethylamino) - 2 - butenyl - 2-trimethoxysilane | DAM. |
| 3,3 - dimethyl - 4 - oxa - 7 - amino - hepten-1-yltrimethoxysilane | APE. |
| 3-aminopropylmethyldimethoxysilane | DAP. |
| 3 - N,N - diethyl - aminopropyltrimethoxysilane | DEP. |
| 3-[N-piperazyl]-propyltrimethoxysilane | PIP. |
| 3,3′ - [N,N′ - piperazyl] - bis-[propyltrimethoxysilane] | DIP. |

4,7,11-triazaundecyltrimethoxysilane.
3,3 - dimethyl - 4 - oxo, 8,12 - diaza - dodecyl-1-enetrimethoxysilane.
4-oxa-7-aminoheptyltrimethoxysilane.
4,7-dioxa-10-aminodecyltrimethoxysilane.
4-thia-6-aminohexyltrimethoxysilane.
3,6-dithia-8-aminotriethoxysilane.

Before the selected coupling agent is effective in any system, it must be hydrolyzed, which requires a combination of water and a base (or acid) catalyst. In the case of trialkoxy silanes, first the siliconate is formed:

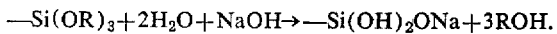

$$—Si(OR)_3 + 2H_2O + NaOH \rightarrow —Si(OH)_2ONa + 3ROH.$$

For convenience, the siliconate is converted to the siliconic acid for reaction with the silica sol.

Hydrolysis develops the full capability of the coupling agent (by removing the protective groups) to function in accordance with this invention when employed with soluble silica. If the hydrolysis is effected in an aqueous solution having a pH of about 7, the hydrolyzed coupling agent molecules are free to polymerize by condensation. The extent of the resulting polymerization is a function of the concentration of coupling agent, i.e. the greater the concentration thereof, the larger the molecular weight of the polymer molecules. At practical concentrations of coupling agent, objectionable gelling occurs. On the contrary, if the hydrolysis is conducted in a strongly basic aqueous solution, no polymerization occurs. When hydrolysis is conducted in an acid aqueous solution, polymerization will proceed to some extent but so long as the pH is relatively low, e.g. below about pH 4, objectionable gelling will not occur for several days.

All temperatures indicated in the following examples are in degrees centigrade.

EXAMPLE 1

To 50.0 ml. of 2.0 N NaOH solution 22.1 g. (0.1 mole) of AP was added slowly and with stirring. The mixture was warmed for about 0.5 hr., then cooled and diluted with water to 100.0 ml. Concentration: 1 M in siliconate. To 10 ml. of water 4.0 ml. of 1 N $H_2SO_4$ was added with stirring followed by the addition thereto of 2.0 ml. of the 1 M sodium 3-aminopropylsiliconate solution. The volume was then adjusted to 25.0 ml. with water providing a concentration of 0.08 M in siliconic acid for the preparation of the water-dispersed compositions as described in Examples 2 and 3.

Other siliconate solutions were prepared in the same way as in Example 1 except that in those instances in which the resulting 1 M solution was cloudy, it was diluted with water to 0.5 M and in the case of other siliconic acids prepared in similar (as in Example 1) manner, provision was made for the fact that one equivalent of acid is required to neutralize the sodium salt resulting from the NaOH addition and one additional equivalent of acid is needed for each amino group contained in the molecule.

Such solutions were found to be stable up to several days, depending on the specific siliconic acid and the pH. The more acidic solutions seemed to keep longer before the formation of precipitate occurred.

EXAMPLE 2

To the appropriate quantity of 0.08 M siliconic acid solution from Example 1 (e.g. 1, 2 or more milliliters, depending on whether a 1:10, 2:10, etc. molar ratio was desired) 0.5 ml. of 0.5 N $H_2SO_4$ was added, with good stirring. This was followed by 10.0 ml. of the alkaline silica sol prepared as described hereinbelow. The water-clear mixture was then aged without stirring for 1-2 hours. The concentrations of silicone residues in the resulting solutions were thus $6.96 \times 10^{-3}$ M in 1:10 formulations and $12.78 \times 10^{-3}$ M in 2:10 formulations (i.e., corresponding to $1.245 \times 10^{-3}$ g./ml. and $2.29 \times 10^{-3}$ g./ml., respectively, of the initial AP).

EXAMPLE 3

To 9.4 ml. water was added with stirring 0.5 ml. of 0.5 N $H_2SO_4$. The appropriate volume (e.g. 1 or 2 ml., depending on the molar ratio desired) of the siliconic acid of Example 1 was also added followed by 0.6 ml. of Du Pont soluble silica (e.g. "Ludox SM-30"), previously diluted 1:3 (by volume) with water. The silicone concentrations in the resulting water-clear product were the same as those prepared with the silica sol made as described hereinabove by the NSA method.

Silicone-silica compositions were prepared using a variety of different silane coupling agents. Both AP and EP are commercially available (Union Carbide Corporation and Dow Corning Corporation, respectively). The AP compound may be prepared by the process described in U.S. Pat. 2,930,809—Jex et al. and the EP compound may be prepared by the process set forth in U.S. Pat. 2,971,864. The APE compound is prepared by the process described in U.S. Pat. 3,549,590—Holdstock et al. and 4-thia-6-amino hexyltrimethoxysilane is prepared by the process set forth in U.S. Pat. 3,488,373—Berger. Other coupling agents employed were prepared as follows:

EXAMPLE 4

For the preparation of DP: into a 3 necked flask containing 333 g. (1.5 moles) of N-(2-aminoethyl)-3-aminopropyltrimethoxysilane and 1.5 g. ammonium chloride catalyst, 64.5 g. (1.5 mole) of ethylene imine was added slowly at 100° C. over a period of 4 hours. A mild exotherm developed and the temperature was maintained at 100–115° by controlling the rate of imine addition. Following completion of the addition, the temperature was held at 120° for three additional hours. A gas chromatography (GC) scan showed starting material as well as mono, di, etc. addition products. It was shown later that the GC analysis of the reaction mixture had not been accurate in determining the degree of completion of the reaction. Even after two days at 120° C., no change in reaction was evident by GC. Upon flashing the mixture at reduced pressure, a cut was obtained (b.p. 130–145°/0.1 mm., 150 g.) which was shown by GC to be about 94% pure. Attempted fractionation resulted in decomposition. The proposed structure set forth in the reaction below was supported by NMR analysis.

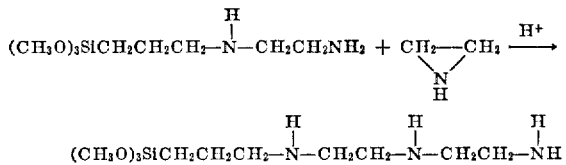

EXAMPLE 5

For the preparation of TP: into a 3 necked flask containing 333 g. (1.5 moles) of N-(2-aminoethyl)-3-aminopropyltrimethoxysilane and 1.5 g. ammonium chloride catalyst was added slowly at 100° C. 129 g. (3 moles) of ethylene imine over a period of 4 hours. A mild exotherm developed and the temperature was maintained at 100–115° C. by the rate of imine addition. Following completion of the addition, the temperature was held at 120° C. for 3 additional hours. Low boiling components (e.g. unreacted ethylene imine) were removed by holding the reaction at 100° C. and 0.2 mm. pressure for 3 hours. Analysis of nuclear magnetic resonance (NMR) indicated the average number of added ethylene imine units incorporated into the product was 2:

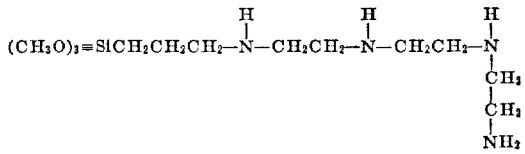

EXAMPLE 6

For the preparation of DAM: to a reaction flask containing 14 g. (0.1 mole) of 1,4-bis(dimethylamino)-butyne-2 and 3 drops of 0.1 N chloroplatinic acid (in isopropanol) was slowly added 16.4 g. (0.1 mole) of triethoxysilane at a temperature of 110° C. No reaction was evident during the addition so the mixture was maintained at reflux for 8 hours. During this time the pot temperature rose from 128° C. to 165° C. Gas chromatographic analysis following the 8 hour reflux period showed that a higher boiling adduct had formed. Fractional distillation of the reaction mixture provided 20 g. (66% yield) of the desired adduct boiling at 104° C./0.6 mm. Hg. The purity of the adduct was >99% by GC.

The infrared spectrum of the distilled product was found to be consistent with the proposed structure.

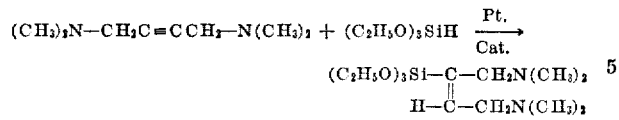

EXAMPLE 7

For the preparation of DPA: cyanoethylmethyldichlorosilane is first prepared as described in U.S. Pat. 2,971,970—Bluestein. Conversion to the alkoxysilane is described in U.S. Pat. 3,008,975—Schubert and this step is followed by reduction as shown in U.S. 2,930,809—Jex et al.

EXAMPLE 8

For the preparation of DEP: into a 3 necked flask equipped with a stirrer, thermometer and condenser and maintained under an inert atmosphere was placed 83.3 g. of 3-chloropropyltrimethoxysilane (0.5 mole), 73 grams of diethyl amine (1.0 mole) and 400 grams of dimethylformamide. The reaction mixture was brought to reflux ~92° and kept at reflux for a period of 6–8 hours. The reaction temperature at this stage was 120° C. Upon cooling, a white crystalline precipitate formed identified as diethylamine hydrochloride. The yield corresponded to roughly 0.5 mole. The resulting clear brownish liquid was fractionated. Upon removal of solvent the product (DEP) was obtained (b.p. 94–85°/2 mm.) The yield was in the order of 85%. A vapor phase chromatography (VPC) scan showed a purity of better than 99%. An infrared (IR) scan taken was consistent with the proposed structure.

EXAMPLE 9

A reaction mixture consisting of 39.8 g. 3-chloropropyltrimethoxysilane (0.2 mole), 17.2 g. piperazine (0.2 mole), 30.6 g. triethylamine (0.3 mole) and 100 ml. dimethylformamide (DMF) were combined and heated to 70° C. for 6 hours. Stirring was vigorously maintained during this time. A voluminous precipitate had formed. A VPC scan showed two adducts were present in addition to the starting silane. Upon further heating at 70° C. no additional changes in product composition (via VPC) were noted. In further experiments, it was noted, however, at higher temperature larger quantities of II (3,3'-[N,N'-piperazyl]-bis-[propyltrimethoxysilane] had formed at the expense of material I (3-[N-piperazyl]propyltrimethoxysiloxane).

The reaction was arbitrarily terminated. The salts were filtered and the DMF was removed at reduced pressure. The remaining liquid flashed at 0.3–0.6 mm. and a fraction was obtained in the range of 68–145° yielding 42 grams. The remaining product in the pot gelled. Several such runs were combined and fractionated. It was noted that the ratios of II to I increased over that initially present prior to distillation. This seemed to indicate that reaction of 3-chloropropyltrimethoxysilane with I was continuing during the distillation. Upon fractionation, pure I (b.p. 102°/0.65 mm.) was obtained. Purity via VPC was >99%. An IR showed weak =NH at 3.1µ, CH₃OSi≡ at 0.2µ and the —(CH₂)₃— in the range 7–8µ.

Pure II was obtained at b.p. 156°/0.2 mm. Purity via VPC was 99%. An IR was similar to I but lacking =NH absorption. Overall yield of both I and II combined based on the chloropropylsilane was 55%.

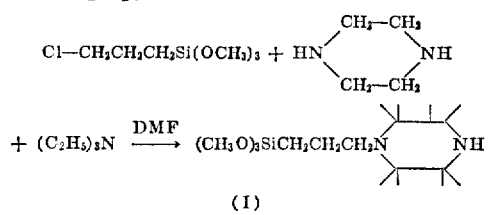

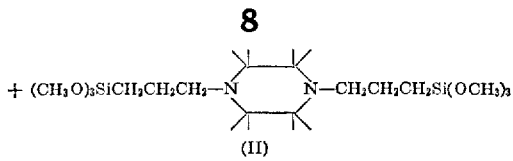

EXAMPLE 10

First, 3-thia-5-mercaptopentyltriethoxysilane (b.p. 108° C./0.7 mm. Hg) was obtained pure and in 65% yield by fractionation of the product mixture from the thermal addition of ethanedithiol to vinyltriethoxysilane, using a substantial excess of ethanedithiol.

Thereafter, to a flask containing 28.4 gm. of the above mercaptothiosilane (0.1 mole) and three drops of Triton B previously heated to 80° C., was added dropwise over a period of one hour 4.3 gm. of ethyleneimine (0.1 mole). A mild exotherm was observed, but reaction temperature was controlled ±5° C. Upon completion of the addition, the reaction mixture was cooked at 80° C. for three hours. During this process a slight amount of precipitate (polyethyleneimine) formed in the flask. The product mixture was filtered at the pump prior to analysis by gas chromatography. This analysis indicated a product yield of approximately 80%. Upon fractionation, the compound distilled over at 162° C./0.6 mm. Hg. Gas chromatographic analysis of the distillate showed the purity exceeded 98%. An infrared spectrum of the material (3,6-dithia-8-aminotriethoxysilane) was entirely consistent with the proposed structure.

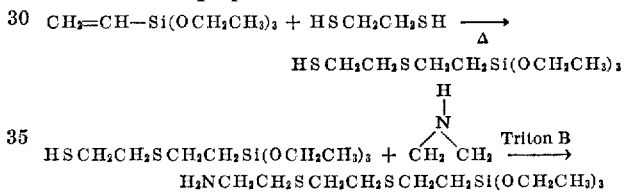

EXAMPLE 11

Into a reaction flask containing 89 g. of 9-decenyl cyanide (b.p. 152°/1.5 mm.) (0.54 mole) and 3 drops of 0.1 N chloroplatinic acid and heated to 100° was added slowly 73 g. of trichlorosilane (0.54 mole). (The 9-decenyl cyanide is prepared by the pyrolysis of castor oil to produce undecylenic acid followed by conversion of the carboxyl group to nitrile by a well-known reaction not shown.) An exothermic reaction occurred and the reaction temperature climbed to 163° C. The silane rate was slowed down until the pot temperature dropped to 130° and was maintained at this level. Toward the end of the reaction, external heat was applied to keep the reaction at 100° C. After heating at 100° C. for 2 hours, the reaction was cooled and examined by VPC. It was indicated that a high boiling adduct had formed and was present to the extent of 75%. Without isolation, the low boiling components were removed up to a pot temperature of 120° C. and 75 mm. pressure. The reaction mixture was subsequently cooled and treated by slowly adding 180 g. methylorthoformate (1.7 moles). A brisk evolution of methyl chloride was observed. Following complete addition of the methylorthoformate, 100 ml. of methanol was added followed by anhydrous ammonia gas for 20 minutes. A small precipitate of ammonium chloride was observed. The reaction was filtered and fractionated. There was obtained 120 g. of product (10-cyanodecyltrimethoxysilane) (b.p. 142°/0.6 mm.).

The 10-cyanodecyltrimethoxysilane (85 g. GC purity 99%) was charged into a Parr hydrogenator with 20 g. Raney nickel catalyst and heated to 110° under 50 p.s.i. hydrogen pressure. After a period of 8 hours a theoretical hydrogen absorption was observed. Further pressure drop did not occur. The reaction was cooled to room temperature, vented of excess pressure, filtered and distilled. There was obtained 50 g. of product 11-aminoundecyltrimethoxysilane, b.p. 138°/0.15 mm. An IR spectrum showed complete absence of nitrile absorption and the appearance of —NH absorption. An NMR was was consistent with the proposed structure.

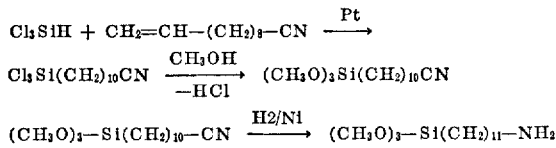

EXAMPLE 12

Into a reaction flask was placed 85 g. of 4-thia-6-amino-hexyltrimethoxysilane (0.35 mole), 15.3 g. of ethylene imine (0.35 mole) and ½ gram of ammonium chloride. The reaction was then brought to reflux and heat was applied for a period of 5-6 hours taking care that the temperature did not exceed 120° C. Following this a GC. showed that a higher boiling adduct was present. Upon fractionation, a pure cut was obtained at 148–150°/0.2 mm. (>99% GC). An IR scan was consistent with the proposed structure (4-thia - 6,8 - aminooctyltrimethoxysilane) and further confirmation was obtained by NMR. Total product obtained was 30 g.

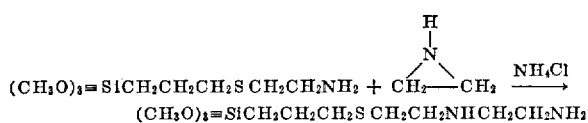

EXAMPLE 13

A solution of 173 g. of 2,2-dimethyl-4-pentenal (1.77 moles) and 106 g. of N,N-dimethylhydrazine was prepared in 250 ml. of dry benzene. The mixture was brought to reflux such that the water was removed azeotropically as it formed. When water no longer collected in a Dean-Stark trap, the product was fractionated. A 95% yield of 2,2-dimethyl-4-pentenal dimethylhydrazone (b.p. 55°/12 mm. VPC purity >99%) was obtained.

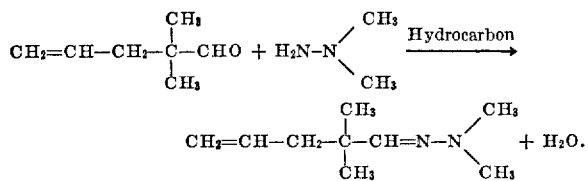

To 22 g. of the hydrazone heated to 120–130° C. and containing 2 drops of Lamoreaux platinum catalyst, 19.3 g. of trimethoxysilane was slowly added. No reaction was evident. It was then brought to reflux at 145° C. After refluxing for about 2 hours, gas chromatography indicated an adduct was being formed. An additional 2 drops of platinum catalyst solution was added and the reaction maintained at reflux. After 42 hours the reaction was about 75% complete. It was terminated and fractionated. The yield of product (b.p. 137°/8 mm.) was 60%. Both IR and NMR were consistent with the product (2,2 - dimethyl - 5 - trimethoxysilylpentenal dimethylhydrazone) structure.

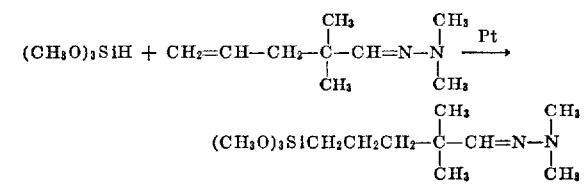

EXAMPLE 14

Into a 500 ml. pressure bottle was placed 50 grams of 3,3 - dimethyl - 4 - oxa-7-amino-hepten-1-yltrimethoxy-silane, 10 grams of Raney Ni T–1 catalyst and ½ gram of sodium methoxide. The bottle was placed in a Parr hydrogenator and pressurized with hydrogen to 55 p.s.i. Shaking was started as the reaction mixture was heated to 95°. As the pressure dropped to 45 p.s.i., additional hydrogen gas was introduced to maintain a pressure of 55 p.s.i. After a time interval of 3 hours a total pressure drop of 31 p.s.i. had occurred and further drop in pressure did not occur. The excess pressure of the cooled system was released and the liquid decanted carefully away from the solid catalyst and distilled to produce 35 grams of product (b.p. 151°/0.5 mm.). The IR showed complete absence of nitrile absorption at 4.38µ present in starting material and also showed the presence of primary amine absorption at 3.05µ. The purity of the product 3,3 - dimethyl - 4 - oxa - 8 - aza-11-aminoundecen-1-yl-trimethoxysilane by VPC was in the order of 99%.

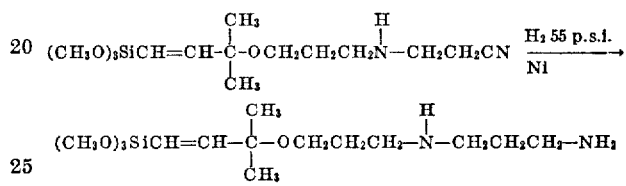

EXAMPLE 15

A mixture containing 44.2 g. (0.2 mole of 3-aminopropyltriethoxysilane, 21.2 g. (0.2 mole) of 4-vinypyridine, and 3 g. of glacial acetic acid was stirred and heated at 120° C. for a period of 4 hours. Gas chromatographic analysis showed the presence of both a mono- and bis-adduct as well as unreacted starting materials. Fractional distillation under high vacuum yielded a mono-adduct (b.p. 140–143° C./0.2 mm. Hg) and a bis-adduct (30 g. with b.p. 163–165° C./0.2 mm. Hg). Both reaction products were pure by GC and their infrared spectra were consistent with the expected molecular structures.

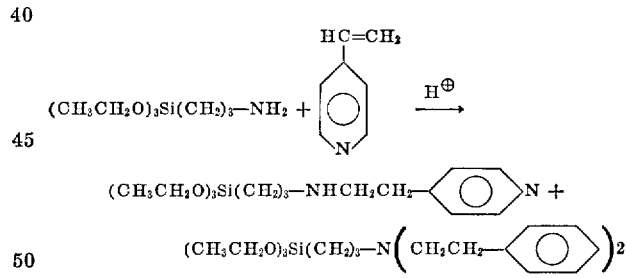

EXAMPLE 16

Into a 500 ml. pressure bottle was placed 98 grams of 4,7-dioxa - 9 - cyano - nonyltrimethoxysilane and 18 grams Raney nickel catalyst. The bottle was placed in a Parr hydrogenator and pressurized with hydrogen to 40 p.s.i. Shaking was started while the reaction mixture was heated to 60–70° C. As the pressure dropped below 30 p.s.i. additional hydrogen gas was introduced to maintain a pressure of 40 p.s.i. After a time interval of 13.5 hours a total pressure drop of 98 p.s.i. had occurred and further drop in pressure did not occur. The excess pressure of the cooled system was released and the brownish liquid was carefully decanted away from the catalyst and distilled. There was obtained 48 grams of product (4,7-dioxa-10-aminodecyltrimethoxysilane), b.p. 133–135°/0.40 mm., whose purity by gas chromatography was >97%. An IR scan showed complete absence of nitrile absorption at 4.45µ and the appearance of amine absorption at 2.1 and 6.25µ. The yield from the hydrogenation reaction was 63%.

EXAMPLE 17

Into a 3-necked flask equipped with an additional funnel, thermometer, stirrer and condenser was placed 102 grams 2-(allyloxy)ethanol (1 mole). The flask was then heated to 80° while 1 cc. of 40% solution of Triton B was added. When the reaction pot reached 80°, the addition of 53 g. cyanoethylene was started. A vigorous exothermic reaction occurred and the external heat source was removed. The reaction temperature was kept at 115°±10° by rate of cyanoethylene addition. After complete addition, the reaction was kept at 110° for 3 additional hours. A VPC scan showed that a high boiling adduct had formed. Upon fractionation, there was obtained 105 grams of product (4,7 - dioxa - 9 - cyano-1-nonene), b.p. 88–90°/0.25 mm.

Thereafter at 100° C. 12.2 grams of trimethoxysilane (0.1 mole) was added dropwise to a mixture of 15.5 grams 4,7-dioxa-9-cyano-1-nonene containing $4 \times 10^{-5}$ moles Pt/mole nitrile as Lamoreaux catalyst. A very exothermic reaction occurred and the temperature climbed to 135°. The external heat source was removed and a temperature of 125°–140° was maintained by rate of addition. After about ¾ of the silane was added, the reaction temperature began dropping and external heat was applied to keep the temperature to 120°. Upon complete addition, the flask was kept at 125° for 3 additional hours and fractionated. Three cuts were taken:

| Head | | Pressure, mm. |
|---|---|---|
| Cut #1 | To 141° | 0.4 |
| Cut #2 | 141° | 0.4 |
| Cut #3 | 144° | 0.45 |

Cuts 2 and 3 were combined (15 grams) and redistilled. The product (4,7-dioxa-9-cyanononyltrimethoxysilane) came off at 137°/0.3 mm. Its purity by VPC was 99%.

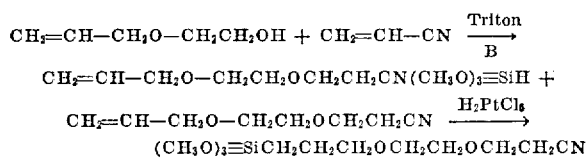

A quantity of (98 grams) of this yield was reacted in hydrogen in the presence of 18 grams of nickel catalyst for 13½ hours. The temperature was maintained in the 60/70° C. range. Pressure was maintained at 40 p.s.i. by recharging to compensate for pressure drop. Forty-eight grams of product 4,7-dioxa-10-aminodecyltrimethoxysilane was obtained (63% yield, 98% pure, b.p. 133/135° C. at 0.4 mm. Hg). An IR analysis showed complete absence of nitrile absorption at 4.45μ and the appearance of two bands (at 2.1μ and 6.25μ) characteristic of amine absorption.

Silicone-silica compositions prepared according to this invention were tested both on building sewage (predominately raw sewage) and on a microbial test culture (MTC). For the preparation of the MTC 175 g. of lettuce was homogenized in about 500 ml. of water. To the homogenate were added 15 ml. each of solutions C and D (below) followed by 0.2 g. of a commercial (Difco) yeast extract and 75 ml. human urine. The mixture was again homogenized for 1 minute, diluted with water to 1 liter and stored under refrigeration.

Solution C:
    0.025 M KH$_2$PO$_4$
    0.025 M NH$_4$OH
Solution D:
    10.0 g. MgSO$_4$.7H$_2$O
    0.5 g. NaCl
    0.5 g. FeSO$_4$.7H$_2$O
    0.5 g. MnSO$_4$.4H$_2$O
    Water up to 250 ml.

To 1 liter of tap water, aerated for 24 hours, were added 50 ml. of concentrated medium (the aforementioned refrigerated mixture) and 10.0 ml. of inoculum (1 day old MTC, before dilution). This mixture was stirred for 24 hours, then diluted with 0.5 liter of aerated tap water, and again incubated with stirring for another 24 hours. Finally, this diluted mixture was left to stand without stirring for 2–4 hours and the supernatant MTC decanted from the sediment, which was discarded.

The original inoculum was obtained by adding to the diluted refrigerated mixture (described above) a few lumps (~5 gm.) of garden soil and a few chunks (~5 gm.) of material from a compost heap. This culture, therefore, contained a complex mixture of wild aerobic mesophiles, mostly coliform.

The resulting MTC consists of a suspension of live mixed mesophilic soil organisms, ranging from $10^8$ to $10^9$ organisms/cc. in concentration, plus some undigested plant matter. The Chemical Oxygen Demand (COD) thereof was about 170 p.p.m. Microscopic examination indicated a large number of bacilli with cocci also present. A detailed examination of the bacterial flora (which undoubtedly changed with time) was not undertaken.

Although the MTC was always prepared by the same procedure, from the same medium concentrate and under controlled conditions, some batch to batch variations in visual appearance and optical absorbance occurred. Accordingly, in testing flocculation it was customary to make measurements (for each flocculant tested) on several different MTC preparations and average the results.

Available evidence has indicated that the MTC biocolloid is more difficult to flocculate than biological waste effluents ordinarily encountered in the field. Generally, only ⅓ to ¹/₁₀ as much flocculant seemed to be required to flocculate raw sewage as was necessary for MTC (the concentration of the sewage and the MTC being equal).

The test procedure using the MTC was different from the jar test procedure employing building sewage. In the test procedure for the MTC, to 100 ml. of MTC in a 150 ml. beaker the appropriate amount of silicone-silica flocculant solution was added. The sample was stirred on a magnetic stirrer for 60 seconds, counting from the start of flocculant addition. Then the beaker was placed on a shaker oscillating at 150 cycles/min. for a period of 15 minutes. The flocculated MTC was then transferred to a 100 ml. volumetric cylinder and allowed to settle for 45 minutes. When particles of floc adhered to the sides of the cylinder, the cylinder was swirled gently to dislodge them.

The effectiveness of the various silicone-silica copolymer flocculants was evaluated by measuring the reduction in the turbidity of the processed MTC at 500 nanometers (nm.). An aliquot was removed from near the top of the volumetric cylinder and the optical absorbence thereof was measured using distilled water as the blank. Measurements of light transmitted through the sample were made using the Gilford attachment to the Beckman DU Spectrophotometer.

The turbidity reduction was expressed as percent of optical absorbance (A) (at 500 nm. nuless otherwise noted) removed (percent R):

$$\text{Percent } R = 1 - \frac{A_{sample}}{A_{MTC}} \times 100.$$

Most of the results reported in the tables set forth below are arithmetic averages of measurements on at least 3, but often as many as 12, separate runs.

In Table II, column X, data are presented from one series of tests wherein the reductions in turbidity were measured as the changes in the perecnt light absorbed at 460 nm. The results in column Y are from a second series of tests wherein the reduction in turbidity were measured as the changes in the percent light absorbed at 500 nm. Flocculation for the data of both Tables II and III was conducted on the MTC medium. Identification letters are from Table I.

TABLE II

| Flocculant | Percent reduction in turbidity | |
|---|---|---|
| | X | Y |
| Inorganic coagulants: 200 p.p.m. alum plus 50 p.p.m. activated silica sol | 60 | |
| Silicone-silica composition: | | |
| 77 p.p.m., 1 mole AP per 10 moles silica sol | 80 | |
| 68 p.p.m., 2 moles EP per 10 moles silica sol | | 97 |
| Organic polyelectrolytes (cationic): | | |
| 40 p.p.m. Rohm and Haas C-7 | *~0 | 26 |
| 40 p.p.m. Dow C-31 | *~0 | |

*Some coagulation occurred but little or no setting of the suspensions during 1 hour of observation.

Table III presents data showing the flocculation activity (or inactivity) of a number of water-soluble silicone-silica compositons. In each case silicic acid sol prepared by the NSA method was contacted with the hydrolyzed carbon-functional silane indicated by substituent, the substituents shown were attached to the silicon atom in $-SiR_{4-n}$ silicones where R is a methoxy or ethoxy group. All the silicone-silica solutions prepared from the silicone materials disclosed herein, which lack of flocculant activity may still be used as sizing agents for glass, as primers or as anti-static agents.

TABLE III

| Substituents on Si in Silane | | Performance |
|---|---|---|
| $-CH_2CH_2CH_2NH_2$ | (AP) | Active. |
| $-CH_2CH_2CH_2NH-CH_2CH_2NH_2$ | (EP) | Do. |
| $-(CH_2)_3(NH-CH_2CH_2)_2NH_2$ | (DP) | Do. |
| $-(CH_2)_3(NH-CH_2CH_2)_4NH_2$ | (TP) | Do. |
| $-C-CH_2-N(CH_3)_2$<br>$\parallel$<br>$C-CH_2-N(CH_3)_2$ | (DAM) | Do. |
| $-CH=CH-C(CH_3)_2-O-(CH_2)_3NH_2$ | (APE) | Do. |
| $-CH_2CH_2CH_2N(CH_2CH_2)_2$ | (DEP) | Do. |
| $-CH=CH-C(CH_3)_2-NH-CH(CH_3)_2$ | | Do. |
| $-CH_3CH_2CH_2CH_3, -CH_3$ | (DAP) | Do. |
| $-(CH_2)_3-C(CH_3)_2-CH=N-N(CH_3)_2$ | | Inactive. |
| $-CH=C-O-(CH_2)_2-C\equiv N$<br>$\vert$<br>$(CH_2)_3-CH_3$ | | Do. |
| $-CH_2-CH_2CH_2C\equiv N$ | | Do. |
| $-CH_2CH_2CH_2Cl$ | | Do. |
| $-CH_2CH_2CH_2COOH$ | | Do. |
| $-CH_2CH_2CH_2SH$ | | Do. |
| $-(CH_2)_4-C_6B_{10}H_{10}$ | | Do. |

The effect on flocculation performance on MTC of change in molar ratio of silicone to silica in silicone-silica flocculant compositions is shown in Tables IV and V. Tables IV and V (for various compositions) also show the effect of concentration (p.p.m.) of flocculant composition on reduction in turbidity of MTC. The various concentrations set forth in both Table IV and Table V are expressed as the weight of the given trialkoxysilane required to form the applied dosage of flocculant composition. Further, Table VI sets forth the ratio of weight of the given alkoxysilane to silica for two different molar ratios in order to facilitate determination of the amounts of silica to be employed to prepare some of the flocculant compositions of this invention.

TABLE IV

| Molar ratio EP:SiO$_2$ | Number of experiments | Percent R average (range) for various concentrations | | | |
|---|---|---|---|---|---|
| | | 10 p.p.m. | 15 p.p.m. | 20 p.p.m. | 25 p.p.m. |
| 0.5:10 | 1 | 26 | 53 | 62 | 68 |
| 1:10 | 6 | 35(31-39) | 56(49-63) | 72(70-73) | 74(69-79) |
| 1.5:10 | 5 | 36(16-58) | 56(39-65) | 68(63-76) | 75(69-83) |
| 1.75:10 | 3 | 39(17-59) | 53(30-66) | 69(55-80) | 81(75-90) |
| 2:10 | 7 | 36(14-59) | 56(35-69) | 73(58-81) | 79(71-84) |
| 2.5:10 | 3 | 26(19-30) | 47(40-52) | 64(62-66) | 76(73-81) |
| 3:10 | 2 | 22(18-26) | 53(49-56) | 72(70-73) | 74(73-74) |

The silica sol used in preparing the silicone/silica compositions of Table IV was prepared by the NSA method described hereinabove.

TABLE V

| Silicone/silica composition (moles) | Conc. (p.p.m.) required for 50% R | Percent R for various concentrations | | |
|---|---|---|---|---|
| | | 10 p.p.m. | 25 p.p.m. | 50 p.p.m. |
| 1 M AP/10 M silica (NSA) | 18-36 | −7 to 1 | 1-62 | 36-92 |
| 2 M AP/10 M silica (NSA) | 15-18 | *8 | 54-64 | 76-98 |
| 1 M EP/10 M silica (NSA) | 11-14 | 28-44 | 87-96 | 96-98 |
| 2 M EP/10 M silica (NSA) | 7-13 | 34-67 | 79-94 | 91-97 |
| 1 M DP/10 M silica (NSA) | 8-11 | 46-55 | 85-94 | 98 |
| 2 M (DAM)/10 M silica (NSA) | 20-41 | *4 | 14-61 | 61-85 |
| 2 M APE/10 M silica (NSA) | 30-38 | 9-24 | 32-48 | 77-81 |
| 1.5 M EP/10 M silica (SM-30)b | 30-33 | | 14-28 | 89-93 |
| 1.5 M EP/10 M silica (TM)c | 18-24 | *−10 | 54-62 | 73-86 |
| 1.5 M EP/10 M silica (HS)d | 35-40 | −2 to 0 | 4-21 | 61-96 |
| 1.5 M AP/10 M silica (HS)d | b47 | *−7 | *8 | *55 |

*Value available from a single run only.
b Ludox SM-30.
c Ludox TM.
d Ludox HS.

TABLE VI

| Silane | Mol wt. silane | Alkoxysilane/silica weight ratio for indicated molar indicated molar ratio | |
|---|---|---|---|
| | | 1:10 | 2:10 |
| AP | 179 | 1:3.35 | 1:1.68 |
| EP | 229 | 1:2.70 | 1:1.35 |
| DP | 265 | 1:2.26 | 1:1.13 |
| DMA | 263 | 1:2.28 | 1:1.14 |

As may be seen from Table V, simple or precise comparisons between different formulations are not easily made, but it can be concluded that those water-soluble compositions resulting from contacting soluble silica with a cationic coupling agent will exhibit superior flocculant activity. Preferable among the cationic coupling agents are the amino-functional multi-alkoxysilanes. The general order of increasing activity for silicone/silica compositions produced using aminoalkylsilicones, at least, appears to be DAP≪DEP<DAM<APE<AP<EP<DP. Also, EP/silica and DP silica formulations not only produced the best results, but also gave the least variable results. In the homologous series AP, EP and DP the effectiveness of flocculating activity, particularly at low dosage levels, increases with increase in the number of aminoethyl links in the aliphatic side chain. In those cases in which negative values resulted the turbidity increased. However, this behavior occurred with small concentrations only.

Tests were also conducted to qualitatively determine the flocculative effectiveness of compositions resulting from contacting a hydrolyzed coupling agent with silicate particles dispersed in water.

EXAMPLE 18

Three drops of hydrolyzed 1 M EP (prepared in the same manner as was the siliconate solution in Example 1) was added with stirring to 100 ml. of MTC. This addition was followed by the addition of about 10 mg. of bentonite (Fisher USP) dispersed homogeneously in 5 ml. of water by shaking. The bentonite clay particles were not "water-dispersed" as defined herein in the sense of the requisite longevity of the homogeneity of the mixture, but upon the addition thereof to the MTC plus EP, flocculation occurred and the flocs slowly settled.

EXAMPLE 19

To 100 ml. MTC 25 µl. of EP sodium siliconate was added with stirring. This step was followed by the addition of 2.0 ml. of water-dispersed bentonite. A 71% reduction in turbidity resulted. The water-dispersed bentonite was prepared as follows: 1.0 g. of bentonite (Fisher USP grade) was added to 100 ml. of water; this mixture was sonicated (30 kHz. at 50 watt power input) for 3 minutes and allowed to settle in a 100 ml. cylinder for 24 hours. The 2.0 ml. of bentonite used was taken from the upper 10 ml. of the 100 ml. cylinder after the settling period.

Neither the silicate particles nor the hydrolyzed coupling agent alone displays flocculative effectiveness, but the composition resulting from the presence of both materials homogeneously dispersed in the aqueous system is definitely effective whether or not the dispersion of silicate particles meets the criteria of being "water-dispersed."

In flocculation tests performed on raw sewage, jar tests (described in A.S.T.M. Special Technical Publication No. 148–6) were run on 300 ml. portions of sewage in an 800 ml. beaker. Floc agent was added, stirred at 80 r.p.m. by a paddle stirrer for 2 minutes, then stirred at 12 r.p.m. for 5 additional minutes and allowed to settle for 5 minutes. Turbidity was measured in Jackson Turbidity Units (employed in connection with the Jackson Turbidometer device commonly used in the water processing industry) and results are set forth in Table VII. Each flocculant composition used in Table VII was prepared by contacting 1.6 moles of EP with 10 moles of silica sol (NSA Method). Adjectives in Table VII describe floc quality, which was judged mostly on the size of the aggregates produced. Those combinations in Table VII showing X's were not tested.

A value of JTU <10 corresponds to approximately <10 p.p.m. solids remaining. The two runs of very dilute sewage-and-floc agent (1.6 EP, 7 and 3.5 p.p.m. sewage) were allowed to settle overnight. The values of JTU after this overnight settling were 2.0 (vs. 5.5) and 1.0 (vs. 3.2).

as the evaluation in Tables II, IV and V. As may be seen in Table VIII, the silicone/silica composition of this invention tested was significantly more effective than the polyelectrolytes and about as effective as the coagulants with much smaller concentrations being required.

TABLE VIII

| Flocculant | Percent reduction in— | |
|---|---|---|
| | Suspended solids | Turbidity |
| Inorganic coagulants: | | |
| 470 p.p.m. ferric chloride | 99 | 98.6 |
| 300 p.p.m. alum | 97 | 96 |
| Silicone/silica composition: 25 p.p.m., 1 mole AP/10 moles silica sol | ~97 | ~97 |
| Organic polyelectrolytes: [a] | | |
| 31 p.p.m. Purifloc 601 (Dow) | 91 | 79 |
| 16 p.p.m. Purifloc C-31, cationic (Dow) | 89 | 40 |
| 60 p.p.m. Nalco 600 (Nalco Chem. Co.) | 87 | 75 |
| 60 p.p.m. Nalco 605 | 85 | 72 |
| 64 p.p.m. Nalco 107 | 85 | 74 |
| 31 p.p.m. Purifloc 602 (Dow) | 83 | 64 |
| 31 p.p.m. Primafloc C-3 (Rohm & Haas) | 83 | 68 |
| 64 p.p.m. Nalco 632 | 79 | 16 |
| 31 p.p.m. Primafloc C-6 (Rohm & Haas) | 77 | 50 |
| 30 p.p.m. Purifloc 401 (Dow) | 75 | 65 |
| 31 p.p.m. Dow B | 71 | 56 |
| 20 p.p.m. Coag. Aid #25 plus 2 p.p.m. #225 (Calgon) | 66 | 35 |
| 8 p.p.m. Purifloc 501 (Dow) | 54 | 35 |
| 60 p.p.m. Floxel 313 (Illinois Water Treatment Co.) | 53 | 39 |
| 31 p.p.m. Dow A | 51 | 7 |
| 30 p.p.m. Purifloc 402 (Dow) | 45 | 20 |
| 8 p.p.m. Purifloc 502 (Dow) | 35 | 17 |
| 0.2 p.p.m. Coagulant Aid #225, anionic (Calgon) | 32 | 32 |
| Primafloc C-7 cationic (Rohm & Haas) | 0 | 0 |
| O'B Floc (O'Brien Industries Inc.) | 0 | 0 |
| Glue | 0 | 0 |

[a] Reported for dosages at which maximal reductions in suspended and turbidity occurred.

TABLE VII

| Suspended solids | 700 p.p.m. | 230 p.p.m. | 70 p.p.m. | 23 p.p.m. | 7 p.p.m. | 3.5 p.p.m. |
|---|---|---|---|---|---|---|
| Init. turbidity | ~600 JTU | ~200 JTU | ~60 JTU | ~20 JTU | ~6 JTU | ~3 JTU. |
| 32 p.p.m. EP/56 p.p.m. $SiO_2$ composition | 17 JTU, poor | 13 JTU, fair | 6 JTU, good | 7 JTU, good—but some fines. | 5.5 JTU, good | X. |
| 12 p.p.m. EP/20 p.p.m. $SiO_2$ composition | X | 9 JTU, fair | 4.5 JTU, very good. | 2.5 JTU, very good. | 2.5 JTU, very good. | X. |
| 4 p.p.m. EP/7 p.p.m. $SiO_2$ composition | X | 28 JTU, poor | 13 JTU, fair | 8 JTU, fair-to-good. | 7.2 JTU, good | X. |
| 1.6 p.p.m. EP/2.7 p.p.m. $SiO_2$ composition | X | X | X | 16 JTU, poor | 5.5 JTU, fair | 3.2 JTU, detectable. |

Each gram of floc (105° C. dried weight) occupies ~250 ml. when loose (in water). This same amount of floc, when drained by gravity, weighs 20–25 g.; when pressure-filtered, it weighs 6 g.

Flocs do not seem to form, when the pH is below pH 4 or above pH 9. The best floc quality seems to occur about pH 6.0. However, some silicone/silica flocculants seem to work better in slightly alkaline conditions.

The silicone/silica flocculant compositions seemingly are unaffected by high NaCl, $Mg^{++}$, $Ca^{++}$, and $Al^{+++}$ concentrations. Floc quality is adversely affected by $Zn^{++}$, but solutions still clear to normal levels. Solution temperature is not a major factor, except hot solutions which may be supersaturated with air, when flocculated, will produce flocs which do not settle. The floc acts as a nucleating site, many small air bubbles form, and the floc floats.

Generally, for both superior floc quality and superior water clearing and solids removal, about 1/10 part silicone (calculated as monomer) should be added per part of suspended solid (SS). Stated another way, for a 100 p.p.m. SS wastewater ~10 p.p.m. silicone and ~20 p.p.m. $SiO_2$ would be used for superior flocculating activity. However, noticeable improvement in the settling of suspended solids has been observed at concentrations of even less than 1/1000 part silicone (calculated as monomer) per part of SS. These figures are only rough, and vary from one wastewater to the next.

The evaluation of flocculant capability on raw sewage (i.e. turbidity) in Table VIII was on the same basis The water-soluble flocculant compositions of this invention particularly those prepared using amino-functional multi-alkoxy silanes (more specifically amino-functional tri-alkoxy silanes) have three characteristic properties useful in the treatment of biological (and other) waste effluents. These characteristics are high biocolloid "knock down power," seeming absence of a peak (or critical) "best" concentration and the production of flocs of a firm, dense, cohesive nature.

In many test runs on MTC using about 50 p.p.m. concentration of flocculant, colloid removals of greater than 95% of optical absorbance (percent R) were obtained routinely. At lower concentrations of the flocculant percent R was lower, e.g. around 90% R at 25 p.p.m. but flocculation in both instances was very fast, the effect occurring in times considerably shorter than 1 minute although it would take several minutes for the liquid to stop swirling (from the imposed agitation) and for the floc to settle.

It was further confirmed that the phenomenon encountered with organic polyelectrolytes whereby resuspension of floc occurs when high flocculant loadings are employed does not occur when water-soluble silicone/silica flocculants are used. By the test in which percent R is determined utilizing transmitted light, none of the flocculants of this invention evidenced such resuspension of floc even at concentrations as high as 200 p.p.m., the highest concentration tested. The only effects noted when the increased flocculant concentrations were employed were the additional firming-up of the floc and a very small increase in percent R. This absence of a critical "best" concentration range is of considerable practical importance, because accidental overdosages e.g. change in the nature of the effluent or metering error will not resuspend the floc.

Further, in contrast to other flocculants useful in the flocculation of biological colloids, the compositions of this invention produce dense flocs that settle easily rather than bulky, fluffy or gelatinous flocs that settle very slowly and are difficult to filter. Also, because of their high water content, bulky gelatinous flocs render disposition difficult.

The high performance of these compositions in the treatment of wastewater will greatly increase the capacity of existing commercial equipment and reduce the cost of new treatment facilities.

Stirring and proper mixing have a profound effect on flocculation. The stirring during mixing enhances the distribution of these soluble flocculating agents and the subsequent stirring influences floc size and density. "Flash" mixing as now used in sewage treatment plants should provide sufficient agitation for effective distribution and floc formation. In the many quantitative studies, flocculant was added to the sample with rapid stirring by a magnetic stirrer (~450 r.p.m.), which was continued for 60 sec. This was followed by 15 min. ripening on a rotary shaker at 150 r.p.m. Finally, the floc was allowed to settle for 45 min. This routine, although not optimized, produced quite uniform results on duplicate runs with the same MTC, and deviations in time of shaking and/or settling (up to 100% longer) did not produce significant difference in percent R.

Preparation of silicone/silica flocculant compositions according to this invention may (in the case of the more highly reactive cationic hydrolyzable coupling agents) be accomplished in situ. That is, the hydrolyzable coupling agent may be added to and mixed with the wastewater flow first, after which the soluble silica (e.g. activated silica sol) would be added and mixed with the same flow. Some silicone/silica flocculant compositions, on the contrary, require aging for as much as several hours to develop maximum activity.

Except in some experiments reported in Table II and Table VII, the efficiency of flocculation was assessed by comparing the absorbance at 500 nm. of MTC with that of the supernatant liquid after flocculation. This wavelength for the turbidity measurements was selected as a compromise between a desired insensitivity to the slight yellow color of MTC (or municipal sewage) on the one hand and the insensitivity to light scattering by suspended submicron particles on the other. Using quartz-distilled water as a reference, flocculated MTC absorbances as low as 0.009 to 0.010 cm.$^{-1}$ could be obtained routinely and 0.006 cm.$^{-1}$ occasionally. Using a sample of MTC centrifuged at 35,000× gravity for ½ hour as the reference, an absorbance of —0.035 com.$^{-1}$ was obtained. This shows that the flocculant compositions of this invention could remove some colored impuritiy from the solution that even centrifugation could not.

When hydrolyzable coupling agents (such as hydrolyzable carbon-functional silanes) are added to wastewater in the absence of soluble silica i.e. without the addition of silica in accordance with this invention, no flocculating activity is apparent. Thus, the silicon/silica flocculant compositons of this invention exhibit far superior flocculating activity than either of the substituents acting alone.

The useful proportions of hydrolyzed coupling agent to silica range from less than 1 part by weight of silicone:20 parts by weight of silica to greater than 1 part by weight of silicone:1 part by weight of silica. Preferred proportions of silicone:silica range from about 1 mole of silicone:10 moles of silica to about 1 mole of silicone:5 moles of silica.

As may be seen from some of the examples presented hereinabove for the preparation of coupling agents for the practice of this invention and, as is well known in the art, the preparation of these compounds in the pure state requires additional process steps to separate products of the initial synthesis. Either chemically pure or impure coupling agents may be contacted with silicaceous colloid (as defined herein) to produce the soluble compositions of this invention. Thus, there is no need to separate the coupling agent from by-products produced therewith during synthesis in order to practice this invention. Such a capability presents a significant economic advantage.

The preparation of various amino-functional monomers set forth in the above description does not form part of the invention claimed hereinbelow.

We claim:

1. A method of coagulating suspended solid impurities in water which comprises distributing in said water a flocculant composition resulting from contacting a silicaceous colloid and at least one organo-functional silane coupling agent that has been hydrolyzed in an aqueous system, said composition being water-dispersed, the proportion of coupling agent to soluble silica being in the range of from less than 1 part by weight of coupling agent:20 parts by weight of soluble silica to greater than 1 part by weight of coupling agent:1 part by weight of soluble silica, said organo-functional silane having the general formula:

wherein R' is a saturated, unsaturated or aromatic hydrocarbon residue that has been functionalized by a member selected from the group consisting of amino, azo, thia, dithia, oxa, and multiples and combinations thereof; R is a hydrolyzable group compatible with R' selected from the group consisting of alkoxy, phenoxy, halo, amino, dialkylamino and tertiary peroxyalkyl, and $n$ is an integer having a value of 1–3, the pH of said water containing impurities being between about 4 and 9 and the flocculant composition being provided in a concentration ranging from less than about 1 p.p.m. to more than 200 p.p.m.

2. The method of claim 1 wherein the silicaceous colloid is a dispersion of silicate particles in water.

3. The method of claim 2 wherein the silicate particles are clay particles.

4. The method of claim 1 wherein the flocculant composition results from separately adding the silicaceous colloid and the organo-functional silane coupling agent to the water containing the suspended solids and the water-dispersed composition is formed in situ.

5. The method of claim 1 wherein the silicaceous colloid consists of water-dispersed silicate particles.

6. The method of claim 1 wherein the silicaceous colloid is a soluble silica.

7. The method of claim 1 wherein the organo-functional silane is an amino-functional multi-alkoxy silane.

8. The method of claim 1 wherein the organo-functional silane is 4,7,10-triazadecyltrimethoxysilane.

9. The method of claim 1 wherein the organo-functional silane is 4-thia-6-aminohexyltrimethoxysilane.

10. The method of claim 1 wherein the organo-functional silane is N-(2-aminoethyl)-3-aminopropyltrimethoxysilane.

11. The method of claim 1 wherein the organofunctional silane is 3-[N-piperazyl]-propyltrimethoxysilane.

12. The method of claim 1 wherein the silane is in the form of a siliconic acid.

References Cited
UNITED STATES PATENTS

| | | | |
|---|---|---|---|
| 2,420,340 | 5/1947 | Ryznar | 210—52 |
| 2,991,257 | 7/1961 | Johannsen | 252—313 S |
| 3,290,165 | 12/1966 | Iannicelli | 106—308 N |
| 3,592,834 | 7/1971 | Buckman et al. | 210—54 |
| 3,519,538 | 7/1970 | Messing et al. | 195—63 |
| 2,676,182 | 4/1954 | Dauot et al. | 252—313 S |

SAMIH N. ZAHARNA, Primary Examiner

B. CASTEL, Assistant Examiner

U.S. Cl. X.R.

210—52, 54

UNITED STATES PATENT OFFICE
CERTIFICATE OF CORRECTION

Patent No. 3,817,861     Dated June 18, 1974

Inventor(s) George M. J. Slusarczuk and John F. Brown, Jr.

It is certified that error appears in the above-identified patent and that said Letters Patent are hereby corrected as shown below:

At the top of column 1 wherein the parties to whom the patent has issued is designated, issuance to the assignee should have been noted. This portion of the specification should more properly read

- George M. J. Slusarczuk, 1555 Regent St., and John F. Brown, Jr., 1479 Dean St., both of Schenectady, N.Y. 12309, assignors to General Electric Company -

Signed and sealed this 22nd day of October 1974.

(SEAL)
Attest:

McCOY M. GIBSON JR.
Attesting Officer

C. MARSHALL DANN
Commissioner of Patents